1,823,269

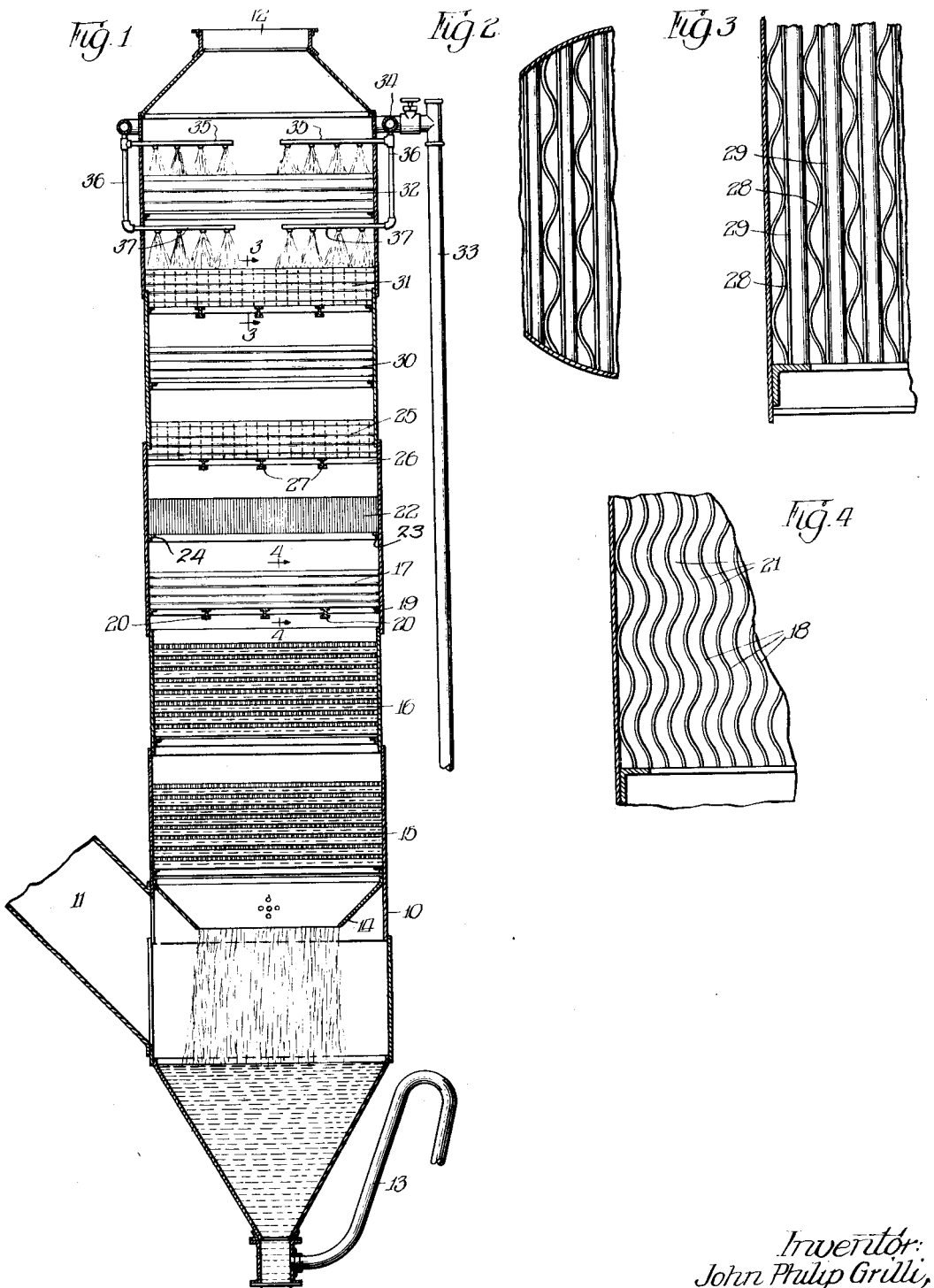
Sept. 15, 1931. J. P. GRILLI 1,823,269
GAS WASHER
Filed June 10, 1929
Inventor:
John Philip Grilli, Patented Sept. 15, 1931

UNITED STATES PATENT OFFICE

JOHN PHILIP GRILLI, OF CHICAGO, ILLINOIS, ASSIGNOR TO H. A. BRASSERT & COMPANY, OF CHICAGO, ILLINOIS, A CORPORATION OF ILLINOIS

GAS WASHER

Application filed June 10, 1929. Serial No. 369,569.

My invention relates to a gas washer of the stationary type, and has particular reference to a washer of the vertical type in which the gas is introduced at the lower end of the tower and passes upward toward the outlet at the upper end of the gas washer tower, with a plurality of hurdles and baffles being located in the tower over which water is caused to pass to wash the particles of dust and dirt off the baffles and hurdles and out of the gas as it passes through the tower.

The primary object of my invention is the provision of a gas washer which will more effectively remove the particles of dust and dirt from the gas as it passes through the washer than what has been accomplished heretofore.

Another object of my invention is the provision of a gas tower having a series of baffles arranged in the tower forming continuous sinuous passages between the baffles in each series through which the gas must pass in the tower arranged in such manner that the gas and water strike against the sides of the baffles and thereby become thoroughly commingled with each other as they pass through the tower.

In ordinary blast furnace practice the gas washer has four functions to perform. First, to clean the gas; second, to cool the gas; third, to condense vapors carried by the gas, and fourth, to eliminate as much as possible the entrained moisture carried in the gas. In order to remove the particles of dirt from the gas it is necessary that these particles of dirt be entrained in small globules of water and carried out of the gas flow in this manner. The most effective way of entraining the dirt particles is to impinge the dirt particles against wetted surfaces where they lodge and are thereafter washed downward and out of the flow of gas by currents of water which pass over these wetted surfaces.

In the usual form of gas washer of the stationary type the usual Zschocke hurdles are employed, which remove approximately 90% of the dirt. The problem in gas washing is to most effectively remove the other 10% in order that the gas may burn readily in burners and also may be used in blowing engines in connection with the operation of the plant.

The most effective method of cleaning the gas and removing the moisture therefrom, aside from mechanical scrubbing, has been to pass the gas through a series of passages where its rate of flow is diminished to such an extent that dirt and moisture entrained therein are thrown out. In our improved invention we provide a series of baffles in the upper part of the tower which cause the gas to change its direction of flow very rapidly and yet its velocity is not reduced to a point below that necessary to throw out the particles of dirt and moisture.

These and other objects of my invention will be more fully and better understood by reference to the accompanying sheet of drawings, and in which—

Figure 1 is a vertical sectional view of a gas washer tower embodying my invention;

Figure 2 is a plan section of one of the series of baffles in the upper part of the stationary tower;

Figure 3 is a vertical sectional view on lines 3—3 of Figure 1; and

Figure 4 is a vertical sectional view of one of the series of baffles in the middle of the tower on line 4—4 of Figure 1.

Referring now specifically to the drawings and in which like reference characters refer to like parts throughout, a gas washer shell 10 is shown having a gas inlet 11 and a gas outlet 12, and having a water pipe 13 connected to the lower portion of the shell so that a water seal is maintained in the lower section of the gas washer tower. An apron 14 is provided which is circular in form and which is secured to the shell 10 in the inside thereof and which serves the function of catching the water falling from the top of the tower and forming a curtain of water below the edges of the apron 14 through which the current of gas must pass after it enters the tower.

Immediately above the apron 14 are two series 15 and 16 respectively of Zschocke hurdles illustrated in Figure 1, which are now in common use in stationary washing towers of this type. Spaced above the series of hurdles 16 is a series 17 made up of a plurality of baffles 18, 18 which are supported at their ends by an annular member 19 and along their edges by cross members 20, 20, these baffles being placed in side to side spaced relation with each other so that a plurality of sinuous passages 21, 21 are formed between each of the baffles 18, 18. The baffles 18, 18 are preferably formed of corrugated metallic sheets, although they may be made of any desired material.

The spacing of the baffles 18, 18 with respect to each other is such that the concave surfaces of the baffles on adjacent sides are substantially in vertical register with each other so that the water in dropping from the concave portion of the baffle strikes against the concave portion of the adjacent baffle thereby breaking up the drops or particles of water and causing it to travel through the series of baffles 17 by a series of splashes from one baffle to another. The angles of the corrugations or wave-like form of the baffles 18, 18 are such that all of the water will not follow the surface of the plates, but will drop from the projecting or concave portions of the baffles in a downward direction thereby breaking the water up into fine particles so as to bring it into intimate contact with the gas.

Above the series 17 of baffles is a second series 22 of baffles, which are supported upon a ring 23 and cross members 24, which are similar to the cross members 20 of the series 17, this series 22 of baffles being formed in exactly the same manner as the series 17 and positioned in the same manner with respect to each other as the baffles 18 except that the baffles of this series 22 are turned at right angles to the baffles forming the series 17.

Spaced upward in the shell 10 from the series of baffles 22 is another series of baffles 25, these baffles being supported upon an annular member 26 and by cross members 27, 27, this series 25 being illustrated in detail in Figures 2 and 3. The series 25 is composed of a plurality of wave-like or corrugated baffles 28, 28 having their corrugations extending in a horizontal direction with other baffles 29, 29 being placed between each pair of baffles 28, 28, these baffles being wave-like or corrugated in form, but having the corrugations extending in a vertical direction.

Above the series 25 of baffles is another series 30 of like form except that the baffles having the horizontal corrugations therein are placed at right angles to the baffles having the horizontal corrugations of the series 25. Above the series 30 is another series 31 of baffles which is precisely like the series 25 and at the top of the tower is a series of baffles 32 which is similar to the series of baffles 31 heretofore described.

A water supply pipe 33 is provided which is connected to a bustle pipe 34 at the upper end of the shell 10 with a plurality of upper water supply pipes 35, 35 being provided which project through the shell 10 and extend in an inwardly converging direction toward the center of the shell 10 and are supplied with nozzles of any suitable form through which the water flows in a downward direction in the shell 10. A plurality of short connecting pipes 36, 36 are provided which are connected to inwardly extending lower water supply pipes 37, 37 which are positioned below the series of baffles 32 for the purpose of supplying an additional quantity of water to the gas washer.

In operation the gas passes through the intake 11 where it passes through the curtain of water falling from the lower edge of the apron 14 and upward through the series of hurdles 15 and 16 into the lower series 17 of the baffles. As the gas passes upward through these baffles it is coming in contact with the water falling from the upper section of the tower which is distributed over the entire surface of the washing tower and falls in rain-like formation down into the series of baffles 17. A quantity of the water will, of course, adhere to the surface of these baffles so that the surfaces of the plates are kept wetted, while other portions of the water will drop from one baffle to another and be broken up by splashing against the inclined surface of the adjacent baffle, thereby keeping the water broken up into small particles and bringing it into close relationship with the gas as it passes through these baffles.

The gas following the sinuous passages 21 strikes against the sides of the baffles 18 and is deflected towards the opposite side so that the particles of dirt in the gas are impinged against the sides of the baffles 18 by the force which is imparted to them by the velocity of the gas. As these particles of dirt are impinged against the wetted surfaces they will adhere to the surfaces so that the water passing downward over the surfaces of the baffles 18, 18 entrain the particles of dirt therein and carry them downward toward the bottom of the gas washer tower.

As the gas passes upward through the second series 22 of baffles precisely the same effect is produced upon the gas as heretofore described as it passes through the series 17. The gas after passing through this series 22 of baffles, passes into the series 25 and here the gas striking against the baffles 28, 28 eddies and whirls into the corrugations or channels formed in the baffles 29 and its progress is not impeded to such an extent as it is while passing through the lower series of baffles. Its velocity is therefore somewhat increased with the result that the particles of dirt remaining in the gas are driven out against the wetted surfaces of the baffles and washed downward into the tower. The operation with respect to these baffles is continued in the upper series of baffles 30, 31 and 32 so that as the gas reaches the top of the tower it is substantially clean and has a very small amount of solid matter left in it.

It may be desirable to dispense with the water pipes 35, 35 and simply allow the gas to pass through the upper series of baffles 30 where the entrained moisture together with particles of the solid material carried by the gas will be thrown out against these surfaces and thereby the gas will be partially dried as it passes through this series of baffles.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A stationary gas washer, comprising in combination a tower having a gas inlet and a gas outlet, water supply means for said tower, hurdles in said tower, and baffles composed of sheets of wave-like form, some of said sheets having channels extending in a vertical direction and others in a horizontal direction, the said sheets being placed in side to side relation with each other and extending across the entire cross section of the tower.

2. A stationary gas washer, comprising in combination a tower having a gas inlet and a gas outlet, water supply means for said tower, a series of hurdles in said tower, and a plurality of series of baffles in said tower, the said baffles being wave-like in form, the baffles of some of the series having continuous sinuous channels therein, and other baffles having passages therethrough which are sinuous in both horizontal and vertical directions and extend across the entire area of said tower.

3. A stationary gas washer, comprising in combination a tower having a gas inlet and a gas outlet, water supply means for said tower, a series of hurdles in said tower, and a plurality of series of baffles of corrugated form, some of the series having baffles therein with corrugations extending in horizontal directions and other series having baffles with corrugations extending in both horizontal and vertical directions, the said baffles in such series being placed in the same plane and in alternate relation with each other and extending across the tower.

4. A stationary gas washer, comprising in combination a tower having a gas inlet and a gas outlet, water supply means for said tower, a series of hurdles in said tower, two series of baffles in said tower composed of corrugated sheets placed in side to side spaced relation with each other, and a series of baffles composed of corrugated sheets having the corrugations extending in both horizontal and vertical directions, the said sheets being placed in alternate relation with each other, the said baffles and hurdles extending across said tower.

Signed at Chicago, Illinois, this 6th day of June, 1929.

JOHN PHILIP GRILLI.